(12) United States Patent
Pereira Bulas Cruz et al.

(10) Patent No.: US 12,174,039 B2
(45) Date of Patent: Dec. 24, 2024

(54) METHOD AND SYSTEM FOR ROAD VEHICLE LOCALISATION

(71) Applicant: MOVINGPOSITIONS GMBH, Braunschweig (DE)

(72) Inventors: Susana Pereira Bulas Cruz, Oporto (PT); Ana Cristina Costa Aguiar, Oporto (PT)

(73) Assignee: MOVINGPOSITIONS GMBH, Braunschweig (DE)

( * ) Notice: Subject to any disclaimer, the term of this patent is extended or adjusted under 35 U.S.C. 154(b) by 203 days.

(21) Appl. No.: 17/800,578

(22) PCT Filed: Feb. 17, 2021

(86) PCT No.: PCT/IB2021/051316
§ 371 (c)(1),
(2) Date: Aug. 18, 2022

(87) PCT Pub. No.: WO2021/165838
PCT Pub. Date: Aug. 26, 2021

(65) Prior Publication Data
US 2022/0397422 A1   Dec. 15, 2022

(30) Foreign Application Priority Data
Feb. 18, 2020   (PT) .......................... 116121

(51) Int. Cl.
*G01C 21/28* (2006.01)
*G01C 21/00* (2006.01)
(Continued)

(52) U.S. Cl.
CPC ....... *G01C 21/3841* (2020.08); *G01C 21/165* (2013.01); *G01C 21/28* (2013.01); *G01C 21/3804* (2020.08); *G01C 25/005* (2013.01)

(58) Field of Classification Search
CPC .. G01C 21/3841; G01C 21/165; G01C 21/28; G01C 21/3804; G01C 25/005
See application file for complete search history.

(56) References Cited

U.S. PATENT DOCUMENTS

| 5,374,933 A | * | 12/1994 | Kao | ....................... G01C 21/30 342/357.31 |
| 2009/0265109 A1 | * | 10/2009 | Truffert | ..................... G01V 3/38 702/5 |

(Continued)

*Primary Examiner* — Keith D Bloomquist
(74) *Attorney, Agent, or Firm* — Rivka Friedman

(57) ABSTRACT

The present invention relates to a road vehicle localisation method based on magnetic landmarks. Said method is comprised by an offline phase and by an online phase. The offline phase is responsible for creating a reference landmark database comprised by a plurality of magnetic landmarks, wherein each magnetic landmark is associated to a path location data. The online phase is projected to match a current anomaly detected with a reference anomaly of the reference landmark database, in order to estimate the location of a vehicle based on the path location data of the correspondent reference landmark.
It is also described a system comprised by a sensor unit, a storage unit and by a processing unit, which is specifically programmed to operate according the road vehicle localisation method developed.

19 Claims, 3 Drawing Sheets

(51) Int. Cl.
    *G01C 21/16*      (2006.01)
    *G01C 25/00*      (2006.01)

(56) References Cited

U.S. PATENT DOCUMENTS

| | | | | |
|---|---|---|---|---|
| 2016/0025498 | A1* | 1/2016 | Le Grand | G01C 21/14 |
| | | | | 701/469 |
| 2017/0219359 | A1* | 8/2017 | Elhoushi | G01S 19/01 |
| 2018/0283882 | A1* | 10/2018 | He | H04L 67/30 |

* cited by examiner

METHOD AND SYSTEM FOR ROAD VEHICLE LOCALISATION

FIELD OF THE INVENTION

The present invention is enclosed in the field of location-based systems. Particularly, the present invention relates to outdoor location-based systems. More particularly, it is herein described a method end respective system for road vehicle localisation based on magnetic landmarks.

PRIOR ART

Vehicle localisation is of utmost relevance in intelligent transportation systems and its numerous applications, thus playing a key role in the future of mobility. Satellite-based localisation is the most used system for road vehicles in outdoor scenarios. However, it presents limitations, namely exhibiting large position errors in multipath environments and non-line-of-sight satellite conditions, and is often combined with additional information sources such as inertial data to perform dead reckoning techniques [1]. However, the information extracted from inertial sensors is subject to cumulative errors and cannot be reliably used alone for long periods of time, namely during long GPS outages or in the presence of large errors, e.g. tunnels, urban canyons, and underground parking.

In positioning systems, including road vehicle positioning, measuring the geomagnetic field is widely applied in dead reckoning for orientation estimation. Furthermore, magnetic field has favourable properties to be used for localisation such as ubiquitousness with no infrastructure deployment, temporal stability, and location-specific disturbances, but also imposes challenges due to diverse conditions of usage, and low discernibility. The use of the magnetic field for localisation purposes, and in particular of magnetic signatures or fingerprints, has been applied with two different approaches [2]: using purposely generated magnetic fields or using the Earth's magnetic field and its distortions. The first requires magnetic based infrastructure deployment with a defined density in the area of interest. The second approach uses existing infrastructure, as proposed for indoor localisation inside buildings, and assumes that the steel and other materials found in structures of buildings, which interacts with the Earth's magnetic field creating distortions, allows the utilization the magnetic field to track the location inside a previously mapped area.

Continuous magnetic fingerprinting has been well explored to complement dead reckoning for location tracking in indoor environments, relying on frequent distortions created by the building structure. When magnetic fingerprints are used indoors for localisation purposes, the whole area of interest, usually the whole building, is mapped and is used.

However, an indoor scenario is very different from an outdoor road vehicle environment, mainly due to the following reasons: the distortions in outdoor environment are less frequent; satellite-based systems have high availability outdoors unlike inside buildings; road vehicle dynamics are different from indoor pedestrian and indoor robot dynamics; and the coverage area is not so easily limited—buildings versus roads—which impacts the mapping effort and the feasibility to determine the initial location, for example. Considering all these difficulties, Wei et al. [3] propose a vehicle localisation approach based on odometry assisted magnetic matching. This includes an offline phase to construct the magnetic map with magnetic field intensities and to coordinate reference points that are uniformly distributed along the road. During the online phase, magnetic field intensities in a certain distance window are matched to the previously constructed magnetic map, providing a position estimation. However, this approach performs continuous matching with a normalization product correlation algorithm in a space-based window which requires the mapping of the whole coverage area (roads). Initial localisation is, therefore, very demanding in terms of computational requirements and inefficient.

REFERENCES

[1] S. Kuutti, S. Fallah, K. Katsaros, M. Dianati, F. Mccullough, and A. Mouzakitis, "A survey of the state-of-the-art localization techniques and their potentials for autonomous vehicle applications," Internet of Things Journal, vol. 5, no. 2, pp. 829-846, 2018.

[2] V. Pasku, A. Angelis, G. Angelis, D. Arumugam, M. Dionigi, P. Carbone, A. Moschitta, and D. Ricketts, "Magnetic field-based positioning systems," IEEE Communications Surveys & Tutorials, vol. 19, no. 3, pp. 2003-2017, 2017.

[3] D. Wei, X. Ji, W. Li, H. Yuan, and Y. Xu, "Vehicle localization based on odometry assisted magnetic matching," in International Conference on Indoor Positioning and Indoor Navigation. IEEE, 2017, pp. 1-6.

Problem to be Solved

Satellite-based systems are the most widespread solution for outdoor localisation. However, they present well-known limitations in multipath environments and non-line-of-sight satellite conditions, e.g. tunnels, underground, urban canyons, and multilevel roads, being frequently combined with other sources of information, like inertial sensors performing dead reckoning techniques. Nevertheless, the information extracted from inertial sensors is subject to cumulative errors and cannot be reliably used alone for long periods of time, namely during long outages or in the presence of large errors. Besides that, geomagnetic-field information is often distorted by strong local magnetic fields caused by road infrastructure.

Considering this, the present invention aims to address limitations of current location-based systems and improve their performance, by providing opportunistic anchors in areas not covered by the said systems. For that purpose, the invention relates to a low-cost solution in terms of equipment and required infrastructure.

SUMMARY OF THE INVENTION

A method for road vehicle localisation based on magnetic landmarks and the respective system of implementing it are proposed. They leverage magnetic data beyond orientation estimation while addressing the limitations of continuous magnetic fingerprinting outdoors, by focusing on opportunistic distortions to the geomagnetic field created by road infrastructure, e.g. tunnels and underground structures, using these anomalies as magnetic landmarks.

To achieve that goal, an object of the present invention is a method comprised by an offline phase and by an online phase. The offline phase is responsible for creating a reference landmark database comprised by a plurality of magnetic landmarks, wherein each magnetic landmark is associated to a path location data. The online phase, in its turn, is projected to match a current anomaly detected with a reference anomaly of the reference landmark database, in order to estimate the location of a vehicle based on the path location data of the correspondent reference landmark.

Also, an object of the present invention is a system for implementing the mentioned method, said system being comprised by a sensor unit, a storage unit and by a processing unit specifically programmed to operate according the method of the invention. All these main components are connected to each other by means of a bidirectional datalink communication, creating a network infrastructure.

DETAILED DESCRIPTION

Figure 1:
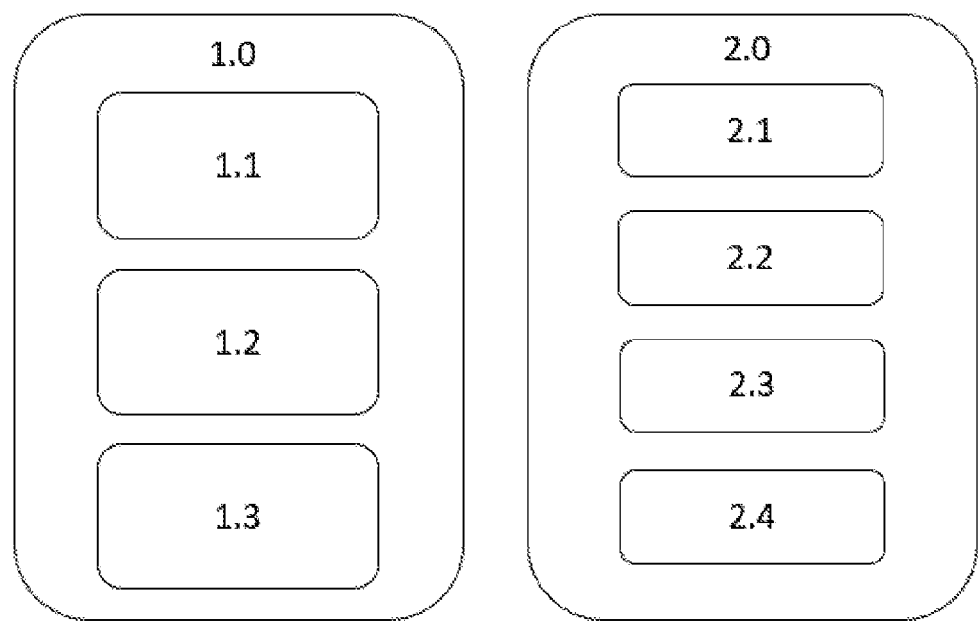
FIG. 1—representation of an embodiment of the invention, wherein the stages executed in the online and the offline phase of the method are identified. The reference signs represent:
- 1.0—Offline phase;
  - 1.1—pre-processing stage;
  - 1.2—anomaly detection stage;
  - 1.3—anomaly mapping stage;
- 2.0—online phase;
  - 2.1—pre-processing stage;
  - 2.2—anomaly detection stage;
  - 2.3—anomaly matching stage;
  - 2.4—localisation stage.
Figure 2:
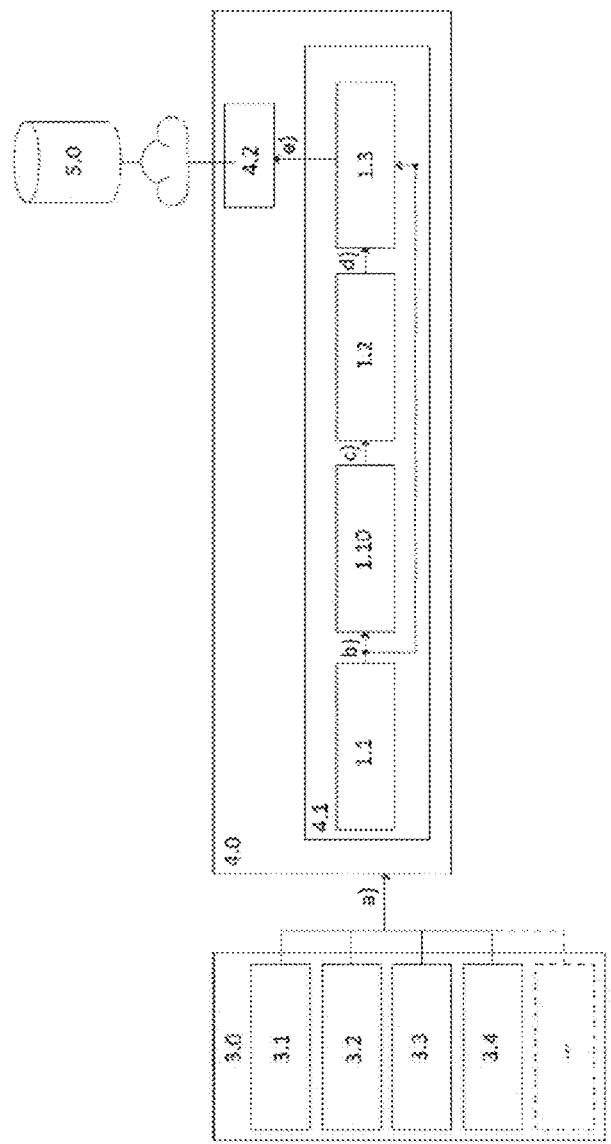
FIG. 2—schematic representation of the elements of the system executing the offline phase of the method developed, wherein the reference signs represent:
- 1.1—pre-processing stage;
- 1.2—anomaly detection stage;
- 1.3—anomaly mapping stage;
- 1.10— sliding window functions;
- 3.0—sensor unit;
  - 3.1—magnetometer;
  - 3.2—gyroscope;
  - 3.3—accelerometer;
  - 3.4—sensor to estimate location;
- 4.0—processing unit;
  - 4.1—processing means;
  - 4.2—communication means;
- 5.0—storage unit;
- a—Input: raw sensor data;
- b—Processed data stream;
- c—features for anomaly detection;
- d—intervals of anomaly;
- e—output of the anomaly mapping stage: reference landmarks information.
Figure 3:
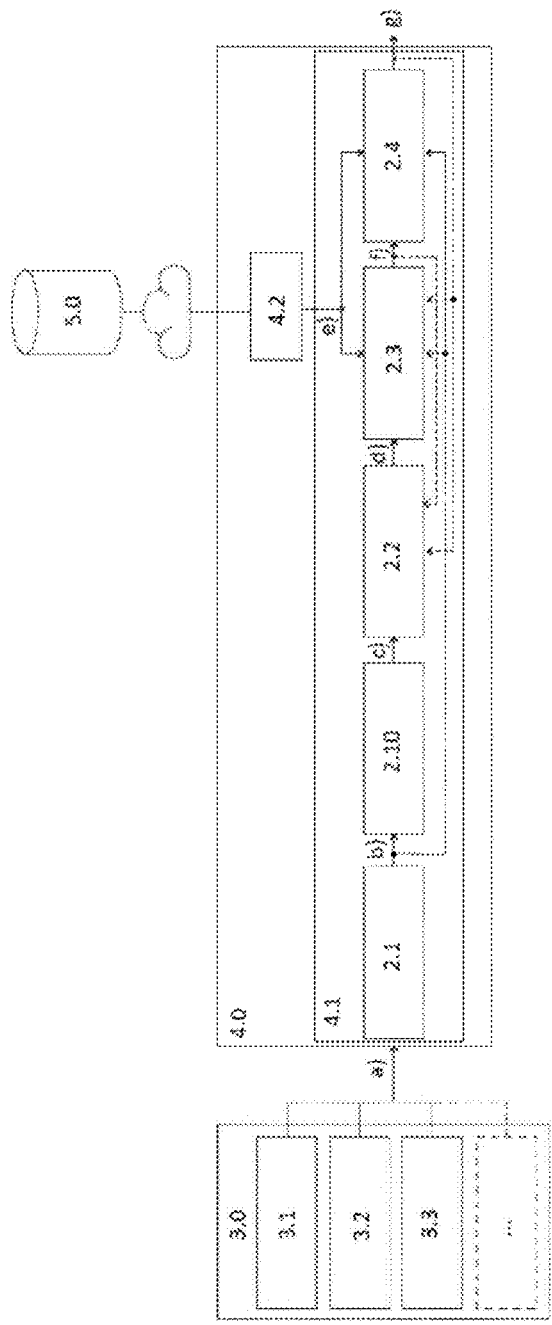
FIG. 3—schematic representation of the elements of the system executing the online phase of the method developed, wherein the reference signs represent:
- 2.1—pre-processing stage;
- 2.2—anomaly detection stage;
- 2.3—anomaly matching stage;
- 2.4—localisation stage;
- 2.10—sliding window functions;
- 3.0—sensor unit;
  - 3.1—magnetometer;
  - 3.2—gyroscope;
  - 3.3—accelerometer;
- 4.0—processing unit;
  - 4.1—processing means;
  - 4.2—communication means;
- 5.0—storage unit;
- a—Input: raw sensor data;
- b—Processed data stream;
- c—features for anomaly detection;
- d—intervals of anomaly;
- e—reference anomalies information;
- f—similarity or dissimilarity between anomalies;
- g—output: location information.

The more general and advantageous configurations of the present invention are described in the Summary of the invention. Such configurations are detailed below in accordance with other advantageous and/or preferred embodiments of implementation of the present invention.

The method of the present invention proposes a localisation scheme based on magnetic fingerprinting, created for outdoor areas where the influence of local magnetic fields is significant, thereby generating magnetic anomalies. Magnetic anomalies associated to their respective path locations are from now on designated as magnetic landmarks. In the context of the present application, magnetic anomalies are sub-sequences in a stream of magnetic data in which the influence of local magnetic fields is noticeable, causing distortions to the expected geomagnetic field. Areas near structures such as tunnels, roads above and below railways and highways, roads above underground car parks and subway stations, present these magnetic anomalies and have high density inside urban areas. Moreover, they coincide with locations where common widely used outdoors localization systems like dead reckoning, GPS, and general satellite-based systems have limitations.

The proposed method concentrates the mapping and matching efforts in locations where the distortions to the geomagnetic field are significant, presenting distinctive patterns, and so enabling a good localization accuracy. In fact, since these areas typically comprise a high density of electrical infrastructure and of ferromagnetic structures, such as steel reinforced concrete, resulting in magnetic anomalies, the object of the present invention provides an accurate and reliable source of location information that can be used jointly with the current location system, e.g. Global Navigations Satellite Systems (GNSS), providing an alternative to their limitations.

For that purpose, the method developed is comprised by a set of procedural stages (1.3, 2.1, 2.2, 2.3, 2.4) designed to leverage magnetic anomalies as landmarks, as a way to provide useful location information from available sensors and infrastructure in an opportunistic fashion, aiming to support existing location systems. To implement the method of the invention, also a system is proposed. Such system is comprised by a sensor unit (3.0) including at least a magnetometer (3.1), at least a gyroscope (3.2) and at least an accelerometer (3.3), and by a central processing unit (4.0) comprised by processing means (4.1) configured to execute the procedural stages of the method developed. Preferentially, the mentioned elements of the system may correspond to the respective hardware elements of a current smartphone provided with the processing and sensorial capabilities as required. Additionally, the system is also comprised by a storage unit (5.0), typically a database, which can be part of the processing unit (4.0) or be remotely connect to it by means of a bidirectional datalink communication provided by communication means (4.2) of the processing unit (4.0).

The following description intends to clearly and objectively describe all the technical particularities of the method and the system object of this invention.

It is proposed a method for road vehicle location based on magnetic landmarks. It is comprised by an offline phase (1.0) and by an online phase (2.0).

The offline phase (1.0) is used to collect inertial and location data so disturbances on the geomagnetic filed, typically perceived as anomalies in the context of orientation estimation for motion tracking, can be determine and associated to a specific location. Such phase (1.0) is comprised by an anomaly mapping stage (1.3) which is projected to collect the mentioned inertial and location data and to create a base-map of magnetic landmarks in order to build a reference landmark database to be stored in the storage unit (5.0). The anomaly mapping stage (1.3) of the offline phase (1.0) is only implemented for areas where the influence of the local magnetic fields is significant and creates magnetic anomalies, such as near structures such as tunnels, roads above and below railways and highways, roads above underground car parks and subway stations. Therefore, only these critical areas where the geomagnetic field presents anomalies, designated as magnetic landmarks when associated to a specific path, will be considered. As a consequence, the size of the required reference database is significantly reduced. This has an impact not only on storage space for the covered area, but also on the size of the search space for matching new inputs. From an online location perspective of a mobile node, it means either the size of the local reference database stored on the node or the required amount of data for communications with the cloud is reduced. The offline phase (1.0) may also comprise the stages of pre-processing (1.1) and anomaly detection (1.2) which are executed prior to the anomaly mapping stage (1.3). In particular, the pre-processing stage is configured to generate processed data streams (b), including a plurality of data parameters, from a received stream of raw inertial data (a) collected from the sensor unit (3.0) which is typically comprised by at least one magnetometer (3.1), at least one gyroscope (3.2), at least one accelerometer (3.3) and at least one sensor adapted to estimate location (3.4). Such processed data streams (b) can be applied to a sliding windows function block (1.10) adapted to extract features (c) that are used by the anomaly detection (1.2) stage in order to be able to define an interval of anomaly to better define such occurrence.

The online phase (2.0) comprises the stages pre-processing (2.1) including data collection in real-time, anomaly detection (2.2) in order to find windows of anomaly in a stream of magnetic data, anomaly matching (2.3) by comparing detected magnetic anomalies to anomalies stored in the reference database, and location (2.4) for estimation of the location of a vehicle. There is a challenge to match time series with similar patterns irrespective of their length and pace, since not only the spatial lengths of the anomalies might vary considerably, but also their paces are determined by the speed of a vehicle being monitored. Therefore, the comparison between anomalies is performed irrespective of their pace in order to compare magnetic data collected at different vehicle speeds and at different sensor sampling rates.

In the pre-processing stage (2.1), the processing means (4.1) of the central processing unit (4.0) receives raw streams of data (a) from the sensor unit (3.0), which is comprised by at least one magnetometer (3.1), at least one gyroscope (3.2) and at least one accelerometer (3.3), and transforms them into processed data streams (b) that serve as input to both the anomaly detection (2.2) and anomaly matching stages (2.3). The raw streams of data (a) are collected by the sensor unit (3.0) located inside the vehicle being monitored, being in a fixed position and orientation relative to it. The sensor unit (3.0) may also be adapted to estimate the speed of the vehicle from the data of collected by the inertial sensors, particularly using an accelerometer (3.3). Additionally, such parameter can be determined by using and an additional sensor, such as GPS or OBD (on-board diagnostics) device. Based on said raw streams of data (a) collected by the sensor unit (3.0), the processing unit (4.0) performs a calibration process, and creates streams of data parameters which are based on: i) the magnetometer data, such as magnitude vector, horizontal intensity, individual axes values in different frames, such as global East-North-Up (ENU) frame or vehicle local frame; ii) direction of the movement of the vehicle on the horizontal plane, estimated using data from the magnetometer (3.1), respective changes since last sample, and differences to the same value estimated form the gyroscope data. The resulting processed data streams (b) are used as input parameters in both the anomaly detection stage (2.2) and anomaly matching stage (2.3).

Specifically, and for that purpose, a sliding windows function block (2.10) is applied to the processed data streams (b) in order to generate input features (c) for the anomaly detection stage (2.2). More particularly, in a first step, the data parameters created in the pre-processing stage (2.1), are accumulated into one or more space sliding windows of the block (2.10), whose size (in meters) can be estimated using the speed vehicle also determined in the pre-processing stage (2.1). A window of the block (2.10) considers only the last samples taken. In this case, the window size is relative to a certain space, i.e. a fixed distance travelled (in meters). For each window of each parameter it is applied a plurality of time domain (e.g. minimum, maximum, mean, mean absolute value, absolute magnitude, root mean square, mean absolute difference, mean absolute deviation, standard deviation, skewness, kurtosis, autocorrelation) and frequency domain functions (e.g. total spectral power, mean spectral power, peak spectral power, peak frequency, median frequency, mean frequency, first moment in the frequency, spectral entropy), in order to obtain the input features (c) for the anomaly detection stage (2.2). In said detection stage (2.2), the generated input features (c) are sent as inputs to a magnetic anomaly detection algorithm in order to limit the space segment corresponding to magnetic anomalies. The mentioned algorithm is based on a binary classifier which is applied to each window and respective input features therein extracted, in the sliding windows function block (2.10), in order to decide if they represent or not an anomaly. Said classifier can be any type of binary classifier, more particularly, it can be a random forest. The magnetic anomaly algorithm can use independent information for the classification of each window or combine information from neighbour windows to improve the global performance of detecting the space segments corresponding to each magnetic anomaly. The anomalies resulting from the anomaly detection stage (2.2) may have a variable space size, including one or more space sliding windows.

In the anomaly matching stage (2.3), the data parameters from the pre-processing stage that are classified as anomalies in the anomaly detection stage (2.2) are passed to a matching magnetic anomalies algorithm adapted to calculate the similarity or dissimilarity (f) between the current anomaly being analysed and the reference anomalies that are stored in the reference database. Each of these tentative matches outputs a dissimilarity measure, with the aim of quantifying how different a current anomaly is from that reference anomaly. To allow different speeds/paces such procedure is implemented using a Dynamic Time Warping (DTW) algorithm. This can be applied to the complete segment of anomaly or to a partial version of it. The space segment that is used is, at any given moment, delimited by the initial point of the anomaly as determined in the anomaly detection stage (2.2), and the current point of the anomaly. Until the current point becomes the final point of the anomaly segment, as determined in the previous stage, the partial version of the anomaly segment is increased as more data is received. The reference anomalies must be collected and saved prior to this sequence of steps and might be in a remote database or in a local database, or a combination of both.

The localisation stage (2.4) is responsible to integrate the information generated in the anomaly matching stage (2.3) into a location algorithm, in order to estimate or improve the location (g) of the vehicle (there may be other sources of location information available, such as GNSS (Global Navigation satellite system, e.g. GPS). An algorithm based on the nearest neighbour or nearest centroid might be applied to classify the current anomaly, choosing the same class (location area and path) of the closest anomaly (lowest dissimilarity value or highest similarity value). A threshold for the dissimilarity (f) between an anomaly and the reference anomalies might be applied, above which none of the classes will be chosen.

The proposed method is projected to technically support the current localisation systems, by allowing to improve their efficiency. Particularly, dead reckoning, which greatly suffers from the geomagnetic field anomalies created by those local magnetic fields in orientation estimation, can not only benefit from the proposed method, in specific from the anomaly detection, by ignoring magnetic data for orientation purposes, but also use the magnetic landmarks to correct the location and reset its cumulative errors.

Satellite-based systems suffer from large errors and outages in areas where the receivers lack line-of-sight to the satellites or require good vertical accuracy, such as urban canyons, tunnels, and multilevel roads. Since these areas typically comprise a high density of metallic structures, resulting in magnetic anomalies, the approach now proposed provides a useful complement in these critical areas. Magnetic landmarks may also serve as anchors for monitoring the integrity of localization systems.

As will be clear to one skilled in the art, the present invention should not be limited to the embodiments described herein, and a number of changes are possible which remain within the scope of the present invention.

Of course, the preferred embodiments shown above are combinable, in the different possible forms, being herein avoided the repetition all such combinations.

The invention claimed is:

1. A method for road vehicle localization based on magnetic landmarks, comprising:
an offline phase (1.0) configured to collect and store magnetic landmarks, each magnetic landmark comprising a magnetic anomaly;
an online phase (2.0) adapted to match a current anomaly with a reference anomaly;
wherein the offline phase (1.0) comprising an anomaly mapping stage (1.3) configured to associate to the magnetic anomaly of each magnetic landmark a path location data, comprised by at least two location data, creating a unique reference landmark to be stored in a reference landmark database; wherein, the magnetic anomaly of each reference landmark is associated to a reference anomaly;
the online phase (2.0) comprising an anomaly matching stage (2.3) followed by a localisation stage (2.4), wherein,
the anomaly matching stage (2.3) is configured to determine anomaly matching between a current anomaly and reference anomalies of the reference landmarks stored in the reference landmark database;
the localisation stage (2.4) is configured to estimate the location of a vehicle, based on the path location data of the reference landmark resulting from the anomaly matching stage (2.3), wherein the offline phase (1.0) and the online phase (2.0) further comprise stages of pre-processing (1.1, 2.1) and anomaly detection (1.2, 2.2), wherein:
the pre-processing stage (1.1, 2.1) is configured to estimate the speed of the vehicle and to generate processed data streams (b), including a plurality of data parameters, from a received stream of raw inertial data (a);
the anomaly detection stage (1.2, 2.2) is configured to define an interval of anomaly (d) from a processed data stream (b) generated by the pre-processing stage;
and wherein,
the processed data streams (b) being an input of:
the anomaly mapping stage (1.3) of the offline phase (1.0);
the anomaly matching stage (2.3) of the online phase (2.0);
and
the output of the anomaly detection stage (1.2, 2.2) being the input of the:
anomaly mapping stage (1.3) of the offline phase (1.0); and
anomaly matching stage (2.3) of the online phase (2.0).

2. Method according to claim 1, wherein the generation of the processed data streams (b) in the pre-processing stage (1.1, 2.1) comprises an initial step of calibration configured to make an adjustment in order to remove bias from the received stream of raw inertial data (a).

3. Method according to claim 1, wherein the generation of the processed data streams (b) in the pre-processing stage (1.1, 2.1) comprises an additional step of reference frame transformation adapted to transform the raw stream of inertial data (a) into a common reference frame.

4. Method according to claim 1, wherein:
the stream of raw inertial data (a) in the offline phase (1.0) comprises data collected from at least one magnetometer (3.1), at least one gyroscope (3.2), at least one accelerometer (3.3) and at least one sensor adapted to estimate location (3.4); and
the stream of raw inertial data (a) in the online phase (2.0) comprises data collected from at least one magnetometer (3.1), at least one gyroscope (3.2) and at least one accelerometer (3.3).

5. Method according to claim 4, wherein the plurality of data parameters included in the processed data streams (b) are related to:
Magnetometer data including magnitude, horizontal intensity, individual axis values in different frames, such as global East, North, Up frame or vehicle local frame;
Direction of movement on the horizontal plane.

6. Method according to claim 1, wherein the anomaly detection stage (1.2, 2.2) comprises the steps of:
applying a sliding window function (1.10, 2.10) to each data parameter of the processed data stream (b), wherein the size of the window is computed based on the estimated speed of the vehicle;
applying a plurality of time domain and frequency domain functions to each window of each data parameter, in order to extract features (c);

applying a binary classifier to the features extracted for each window, in order to limit the space segments that correspond to a magnetic anomaly, defining an interval of anomaly in the processed data streams (b).

7. Method according to claim 6, wherein:
the time domain functions are at least one of the following: minimum, maximum, mean, mean absolute value, absolute magnitude, root mean square, mean absolute difference, mean absolute deviation, standard deviation, skewness, kurtosis and autocorrelation time domain function; and
the frequency domain functions are at least one of the following: total spectral power, mean spectral power, peak spectral power, peak frequency, median frequency, mean frequency, first moment in the frequency, spectral entropy.

8. Method according to claim 6, wherein the binary classifier is random forest.

9. Method according to claim 6, wherein the binary classifier is programmed to:
use exclusively features from each window; or
combine features from neighbour windows.

10. Method according to claim 1, wherein the anomaly mapping stage (1.3) of the offline phase (1.0) comprise the steps of:
generating a unique reference landmark, based on:
processed data streams (b) from the pre-processing stage (1.1) and respective path location data; and
intervals of anomalies (d) from the anomaly detection stage (1.2);
creation of the reference landmark database for storing each reference landmark.

11. Method according to claim 10, wherein the generation of the reference landmark includes associating a reference anomaly to said reference landmark, wherein,
the reference anomaly being generated by averaging the processed data streams (b) inside of an interval of anomaly (d) and respective path location data for magnetic landmarks with similar paths.

12. Method according to claim 11, wherein the averaging the processed data streams (b) is executed applying a DTW barycentre to calculate the centroid of each reference anomaly.

13. Method according to claim 11, wherein the anomaly matching stage (2.3) of the online phase (2.0) comprises the steps of:

Receiving input data from the pre-processing stage (2.1) and the anomaly detection stage (2.2) of the online phase (2.0) of the current anomaly detected;
Processing input data; such processing stage being programmed to calculate a measure to quantify similarity or dissimilarity between the current anomaly and reference anomalies associated to reference landmarks of the reference landmark database.

14. Method according to claim 13, wherein the measure to quantify similarity or dissimilarity (f) is obtained applying the DTW algorithm between the current anomaly and reference anomalies.

15. Method according to claim 14, wherein the localisation (2.4) stage of the online phase (2.0) comprises the steps of:
determining the reference landmark of the reference database whose respective reference anomaly has the lowest dissimilarity or highest similarity measure in relation to the current anomaly;
Retrieving a current location data from the path location data of the reference landmark.

16. Method according to claim 1, wherein the path location data of the reference landmark resulting from the anomaly matching stage (2.3) is fused with location data from a satellite-based localisation system.

17. System for road vehicle localization comprising:
A sensor unit (3.0), adapted to collect inertial data;
A storage unit (5.0); and
A processing unit (4.0),
wherein,
the sensor unit (3.0), the storage unit (5.0) and the processing unit (4.0) are all connected by means of a bidirectional datalink communication;
and
the system being characterized in that the processing unit (4.0) comprises processing means configured to operate according to the method of claim 12.

18. System according to claim 17, wherein the sensor unit (3.0) includes at least:
one magnetometer (3.1);
one gyroscope (3.2); and
one accelerometer (3.3).

19. System according to claim 18, wherein the sensor unit (3.0) further comprises a sensor adapted to estimate location (3.4).

* * * * *